UNITED STATES PATENT OFFICE.

ISAAC B. ABRAHAMS, OF NEW YORK, N. Y.

PLASTIC COMPOSITION OF MATTER FOR THE MANUFACTURE OF JEWELRY AND FANCY ARTICLES.

SPECIFICATION forming part of Letters Patent No. 226,583, dated April 20, 1880.

Application filed February 19, 1880.

*To all whom it may concern:*

Be it known that I, ISAAC B. ABRAHAMS, of the city, county, and State of New York, have invented certain new and useful Improvements in Plastic Compositions of Matter for the Manufacture of Jewelry and Fancy Articles, of which the following is a specification.

The object of this invention is to furnish, for making cheap jewelry and fancy articles, an improved composition of matter, to which I have given the name of "Amyloid," and by which, according to the color imparted to it by suitable dyes or pigments, either horn, amber, coral, tortoise-shell, jet, ivory, or other material may be imitated.

The invention consists of a composition prepared essentially of glue, rosin, and starch, which are homogeneously united by the action of heat and by the use of diluted acids in the following manner and proportions: One part of glue, gelatine, or other glutinous substance is dissolved in two parts of slightly acidulated water, and promptly mixed with one part of rosin, shellac, or an equivalent substance, which has first been liquefied by heat and the addition of some turpentine. To this mixture four parts of starch, potato or rice flour are added, and thoroughly united therewith by continual stirring, the mixture being heated over steam. The starch is, by the action of the heat, gradually changed to dextrine, which change is accelerated and rendered more complete by the addition of diluted acetic, oxalic, or other acid to the mass. The presence of the acid renders the mass more homogeneous and produces the more intimate combination of the component parts with each other. The stirring is continued until an almost transparent and colorless mass of a plastic nature is obtained, which may then be molded by dies.

The mass hardens after cooling, has the appearance of bleached horn, and is not liable to shrink.

By adding proper dyes or pigments the mass may be made of any color, according as it is to resemble amber, coral, tortoise-shell, jet, ivory, &c.

The proportions given may be varied from according to the transparency, toughness, and finish which is to be imparted to the articles to be made from the composition.

Having thus described my invention, I claim as new and desire to secure by Letters Patent—

1. A composition of matter consisting of glue, rosin, and starch, substantially as set forth.

2. As a new article of manufacture, jewelry or fancy articles made from a composition of glue, rosin, starch, and a suitable dye or pigment, substantially as set forth.

3. The process herein described of uniting glue, rosin, and starch into a homogeneous mass, consisting in mixing the glue and rosin in liquid state, then adding the starch and uniting it to the glue and rosin by means of heat and a diluted acid, substantially as specified.

In testimony that I claim the foregoing as my invention I have signed my name, in presence of two witnesses, this 12th day of February, 1880.

ISAAC B. ABRAHAMS.

Witnesses:
PAUL GOEPEL,
ADOLF DENGLER.